(12) United States Patent
Harrity

(10) Patent No.: US 7,664,748 B2
(45) Date of Patent: Feb. 16, 2010

(54) SYSTEMS AND METHODS FOR CHANGING SYMBOL SEQUENCES IN DOCUMENTS

(75) Inventor: John Eric Harrity, 6447 Muster Ct., Centreville, VA (US) 20121

(73) Assignee: John Eric Harrity, Centreville, VA (US)

( * ) Notice: Subject to any disclaimer, the term of this patent is extended or adjusted under 35 U.S.C. 154(b) by 854 days.

(21) Appl. No.: 10/895,330

(22) Filed: Jul. 21, 2004

(65) Prior Publication Data

US 2006/0010109 A1 Jan. 12, 2006

Related U.S. Application Data

(60) Provisional application No. 60/586,719, filed on Jul. 12, 2004.

(51) Int. Cl.
*G06F 17/30* (2006.01)

(52) U.S. Cl. .............................. 707/6; 707/3; 715/257

(58) Field of Classification Search ................ 707/102, 707/3, 6; 715/533, 257
See application file for complete search history.

(56) References Cited

U.S. PATENT DOCUMENTS

| | | | | |
|---|---|---|---|---|
| 5,146,405 A * | 9/1992 | Church | ............ | 704/9 |
| 5,560,037 A * | 9/1996 | Kaplan | ............ | 715/201 |
| 5,604,897 A * | 2/1997 | Travis | ............ | 715/533 |
| 5,682,439 A * | 10/1997 | Beernink et al. | ............ | 382/187 |
| 5,761,689 A | 6/1998 | Rayson et al. | ............ | 707/533 |
| 5,764,910 A * | 6/1998 | Shachar | ............ | 709/223 |
| 5,787,451 A * | 7/1998 | Mogilevsky | ............ | 715/257 |
| 5,940,847 A * | 8/1999 | Fein et al. | ............ | 715/540 |
| 6,047,300 A * | 4/2000 | Walfish et al. | ............ | 715/533 |
| 6,085,206 A * | 7/2000 | Domini et al. | ............ | 715/257 |
| 6,131,102 A * | 10/2000 | Potter | ............ | 715/533 |
| 6,424,983 B1 * | 7/2002 | Schabes et al. | ............ | 715/533 |
| 6,601,059 B1 * | 7/2003 | Fries | ............ | 707/3 |
| 6,770,631 B1 * | 8/2004 | Cox et al. | ............ | 514/44 |
| 7,047,493 B1 * | 5/2006 | Brill et al. | ............ | 715/257 |
| 7,069,271 B1 * | 6/2006 | Fadel et al. | ............ | 707/102 |
| 7,149,970 B1 * | 12/2006 | Pratley et al. | ............ | 715/533 |
| 2002/0010726 A1 * | 1/2002 | Rogson | ............ | 707/533 |
| 2002/0095448 A1 * | 7/2002 | Selby | ............ | 707/533 |
| 2003/0033288 A1 * | 2/2003 | Shanahan et al. | ............ | 707/3 |
| 2003/0172357 A1 * | 9/2003 | Kao et al. | ............ | 715/529 |
| 2004/0093567 A1 * | 5/2004 | Schabes et al. | ............ | 715/533 |
| 2004/0197791 A1 * | 10/2004 | Makarov et al. | ............ | 435/6 |
| 2004/0220920 A1 * | 11/2004 | Bax et al. | ............ | 707/3 |
| 2005/0210383 A1 * | 9/2005 | Cucerzan et al. | ............ | 715/533 |
| 2005/0283726 A1 * | 12/2005 | Lunati | ............ | 715/533 |
| 2006/0143564 A1 * | 6/2006 | Bates et al. | ............ | 715/533 |

OTHER PUBLICATIONS

Courter et al., "Mastering Microsoft Office 2000 Professional Edition", 1999, Sybex, p. 12, 90-95.*
Microsoft Office 2003, Professional Edition, Beta 2, Version XI, Microsoft Developer Network, Jun. 2003.*

(Continued)

*Primary Examiner*—Khanh B Pham

(57) ABSTRACT

A computer-readable medium includes instructions for causing at least one processor to perform a method. The method may include receiving a symbol sequence into a document, identifying another symbol sequence in the document whose probability of matching the received symbol sequence is above a threshold, and replacing the received symbol sequence with the other symbol sequence.

13 Claims, 13 Drawing Sheets

OTHER PUBLICATIONS

Courter et al., "Mastering Microsoft Office 2000 Professional Edition", 1999, Sybex, p. 12, 36-37, 90-95, 100, 326, 478, 603.*

Koehn, et al., "Estimating Word Translation Probabilities from Unrelated Monolingual Corpora Using the EM algorithm", American Association for Artification intelligence conference (AAAI'00), 2000, p. 1-9. (repaginated).*

OED.com, Definition of "Probability", Dec 1989, Oxford English Dictionary Online, 2nd Ed. Oxford University Press, p. 1-6.*

Durham et al, "Spelling Correction in User Interfaces", Oct. 1983, Communications of the ACM, p. 764-773.*

Kukich, "Techniques for Automatically Correcting Words in Text", Dec. 1992, ACM Computing Surveys, p. 377-439.*

Chen et al, "A New Statistical Approach to Chinese Pinyin Input", Oct. 2000, Proceedings of the 38th Annual Meeting on Association for Computational Linguistics ACL'00, p. 241-247.*

Ruch et al, "Toward filling the gap between interactive and fully-automatic spelling correction using the linguistic context", Oct. 2001, IEEE International Conference on Systems, Man, and Cybernetics, ISBN: 0-7803-7087-2 p. 199-204.*

Suhm et al, "Multimodal Error Correction for Speech User Interfaces", Mar. 2001, ACM Transactions on Computer-Human Interaction 2001, vol. 8, No. 1, p. 60-98.*

Read et al, "Oops! Silly me! Errors in Handwriting Recognition-based Text Entry Interface for Children", Oct. 2002, Proceedings of the Second Nordic Conference on Human-Computer Interaction, p. 35-40.*

Kwok et al, "Corpus-Based Pinyin Name Resolution", Sep. 2002, Proceedings of the first SIGHAN Workshop on Chinese Language Processing, vol. 18, p. 1-7.*

Tsuruoka et al, "Probabilistic Term Variant Generator for Biomedical Terms", Jul. 2003, ACM SIGIR'03, ACM Press, p. 167-173.*

Branting, "A Comparative Evaluation of Name-Matching Algorithms", Jun. 2003, ICAIL'03, ACM Press, p. 224-232.*

Ma et al, "Adaptive Hindi OCR Generalized Hausdorff Image Comparison", Sep. 2003, ACM Transactions on Asian Language Information Processing, vol. 2, No. 3, p. 193-218.*

Miller et al, "Cluster-Based Find and Replace", Apr. 2004, Proceedings of the SIGCHI Conference on Human Factors in Computing Systems, ACM Press, vol. 6, No. 1, p. 57-64.*

* cited by examiner

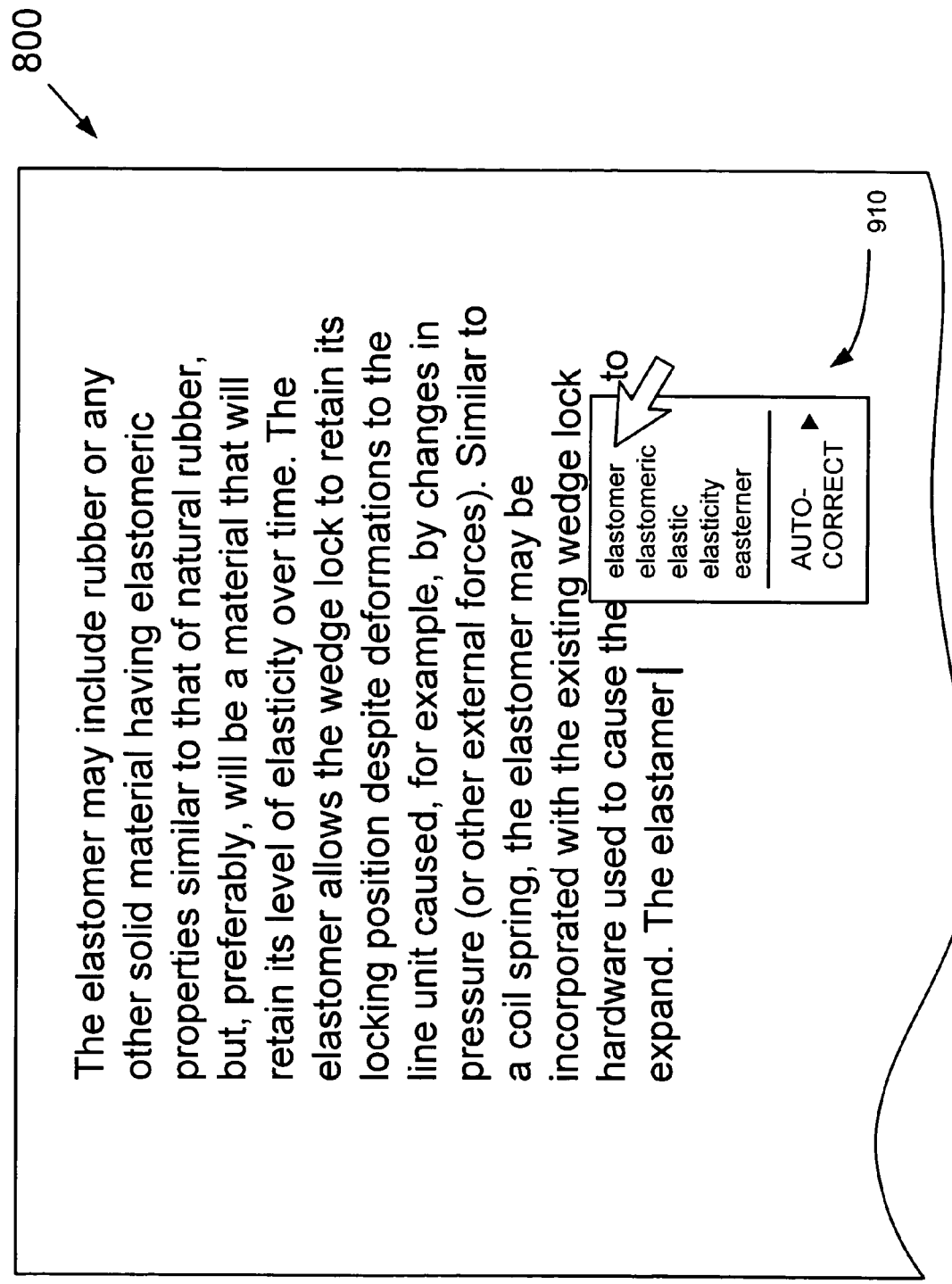

1000

The circuit includes a phase synchronization feedback loop, a frequency synchronization feedback loop, and a phase shift measurement circuit. When an input to the frequency synchronization feedback loop is set to zero, the phase synchronization feedback loop is operated at a high bandwidth rate to ensure a synchronized phase. Once the frequency offset has been computed, the input to the frequency synchronization feedback loop is set to the computed value of frequency offset, and the frequency synchronization feedback loop and the phase synchronization feedback loop are jointly operated at a low bandwidth rate to synchronise

The circuit includes a phase synchronization feedback loop, a frequency synchronization feedback loop, and a phase shift measurement circuit. When an input to the frequency synchronization feedback loop is set to zero, the phase synchronization feedback loop is operated at a high bandwidth rate to ensure a synchronized phase. Once the frequency offset has been computed, the input to the frequency synchronization feedback loop is set to the computed value of frequency offset, and the frequency synchronization feedback loop and the phase synchronization feedback loop are jointly operated at a low bandwidth rate to synchronize

FIG. 13

SYSTEMS AND METHODS FOR CHANGING SYMBOL SEQUENCES IN DOCUMENTS

RELATED APPLICATION

This application claims priority under 35 U.S.C. §119 based on U.S. Provisional Application No. 60/586,719, filed Jul. 12, 2004, the disclosure of which is hereby incorporated in its entirety by reference herein

FIELD OF THE INVENTION

Implementations consistent with the principles of the invention relate generally to computer systems and, more particularly, to systems and methods for changing symbol sequences in documents.

BACKGROUND OF THE INVENTION

A computer-implemented editing system is a system capable of creating and altering electronic documents, such as word processing documents, spreadsheets, databases, e-mail messages, and the like. There are a wide variety of editing programs available that allow conventional personal computers to function as sophisticated computer-implemented editing systems.

SUMMARY OF THE INVENTION

In accordance with the purpose of this invention as embodied and broadly described herein, a computer-readable medium includes instructions that cause at least one processor to perform a method. The method may include receiving a symbol sequence into a document; comparing the received symbol sequence to a list of previously-stored words; comparing the received symbol sequence to other symbol sequences in the document when the received symbol sequence does not match any of the words in the list; determining a probability of the received symbol sequence matching one or more other symbol sequences in the document when the received symbol sequence does not match any of the other symbol sequences in the document; determining a probability of the received symbol sequence matching one or more variations of another symbol sequence in the document when the received symbol sequence does not match any of the symbol sequences in the document; replacing the received symbol sequence with another symbol sequence in the document or a variation of another symbol sequence in the document when the probability of the received symbol sequence matching the other symbol sequence is above a threshold; obtaining a number of symbol sequences from the document and a number of words from the list that most closely match the received symbol sequence to form a second list when the probability of the received symbol sequence matching another symbol sequence in the document or a variation of another symbol sequence in the document does not exceed the threshold; ranking the second list based on the symbol sequences in the document to form a ranked list of items; providing the ranked list of items; detecting selection of an item in the ranked list of items; and replacing the received symbol sequence with the selected item.

In another implementation consistent with the principles of the invention, a computer-readable medium includes instructions for causing at least one processor to perform a method. The method may include receiving a symbol sequence into a document, identifying another symbol sequence in the document whose probability of matching the received symbol sequence is above a threshold, and replacing the received symbol sequence with the other symbol sequence.

In still another implementation consistent with the principles of the invention, a computer-readable medium may include instructions that cause at least one processor to perform a method. The method may include identifying a symbol sequence in a document that closely matches a first symbol sequence in the document; identifying a word in a list of previously-stored words that closely matches the first symbol sequence; ranking the identified symbol sequence and word to form a ranked list of objects; and providing the ranked list of objects.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 8 and 9 illustrate a second example, consistent with the principles of the invention, of the processing described in FIGS. 4 and 5;

FIGS. 10 and 11 illustrate a third example, consistent with the principles of the invention, of the processing described in FIGS. 4 and 5; and FIGS. 12 and 13 illustrate a fourth example, consistent with the principles of the invention, of the processing described in FIGS. 4 and 5.

DETAILED DESCRIPTION

The following detailed description of implementations consistent with the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention improve the changing of symbol sequences in documents. In one implementation, an unknown symbol sequence in a document, such as a word processing document, is compared to other symbol sequences in the document. If the unknown symbol sequence closely matches another symbol sequence (or variation of the other symbol sequence) in the document, the unknown symbol sequence may be automatically replaced with the closely matching symbol sequence (or variation). Alternatively, a list of closely matching symbol sequences from the document may be generated, along with a list of closely matching words from a dictionary. The two lists may be combined and the combined list may be ranked based on the symbol sequences in the document. The ranked list (or a predetermined number of highest ranking items in the ranked list) may be provided to a user. Upon selection of one of the items in the provided list, the unknown symbol sequence may be automatically replaced with the selected item. In this way, auto-correction of symbol sequences in documents can be improved.

Exemplary System

Figure 1:
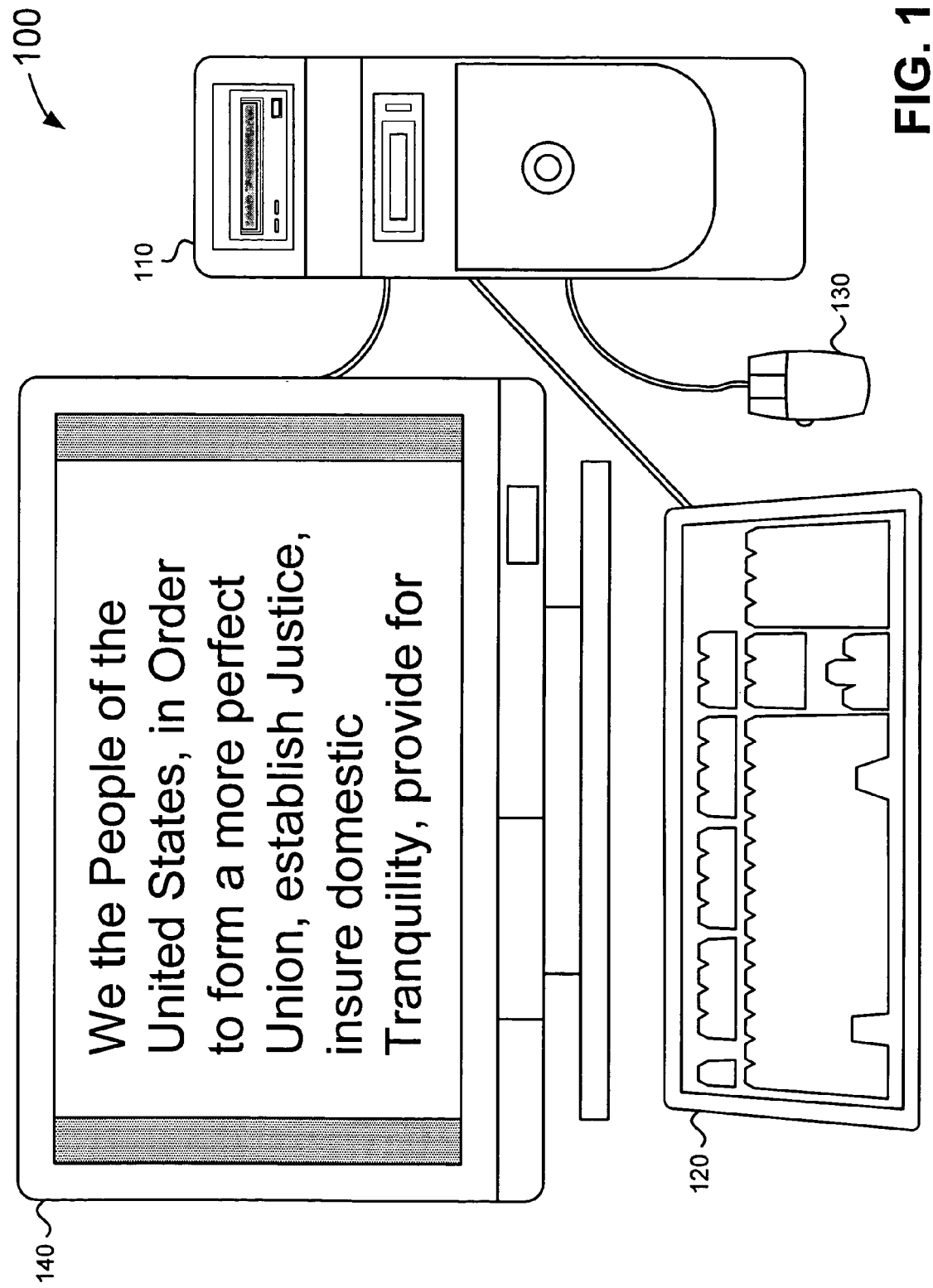
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. System 100 may include a computer 110, a keyboard 120, a pointing device 130, and a monitor 140. The components illustrated in FIG. 1 have been selected for simplicity. It will be appreciated that a typical system may include more or fewer components than illustrated in FIG. 1. Moreover, it will be appreciated that a typical system could include other components than those illustrated in FIG. 1.

Computer 110 may include any type of computer system, such as a mainframe, minicomputer, personal computer, or the like. In alternative implementations consistent with principles of the invention, computer 110 may alternatively include a laptop, personal digital assistant, cellular telephone, or the like. In fact, computer 110 can include any device capable of running word processing programs. In some implementations consistent with the principles of the invention, keyboard 120, pointing device 130, and/or monitor 140 may be integrated with computer 110.

Keyboard 120 may include any conventional keyboard or keypad that allows a user to input information into computer 110. Pointing device 130 may include one or more conventional pointing devices, such as a mouse, a pen, a trackball, a glide pad, biometric pointing devices, or the like.

Monitor 140 may include any conventional device capable of displaying images to a user. Monitor 140 may, for example, include a cathode ray tube display, a liquid crystal display, a gas panel display, or the like. In alternative implementations, pointing device 130 may be integrated within monitor 140 through the use of touch-screen technology.

Figure 2:
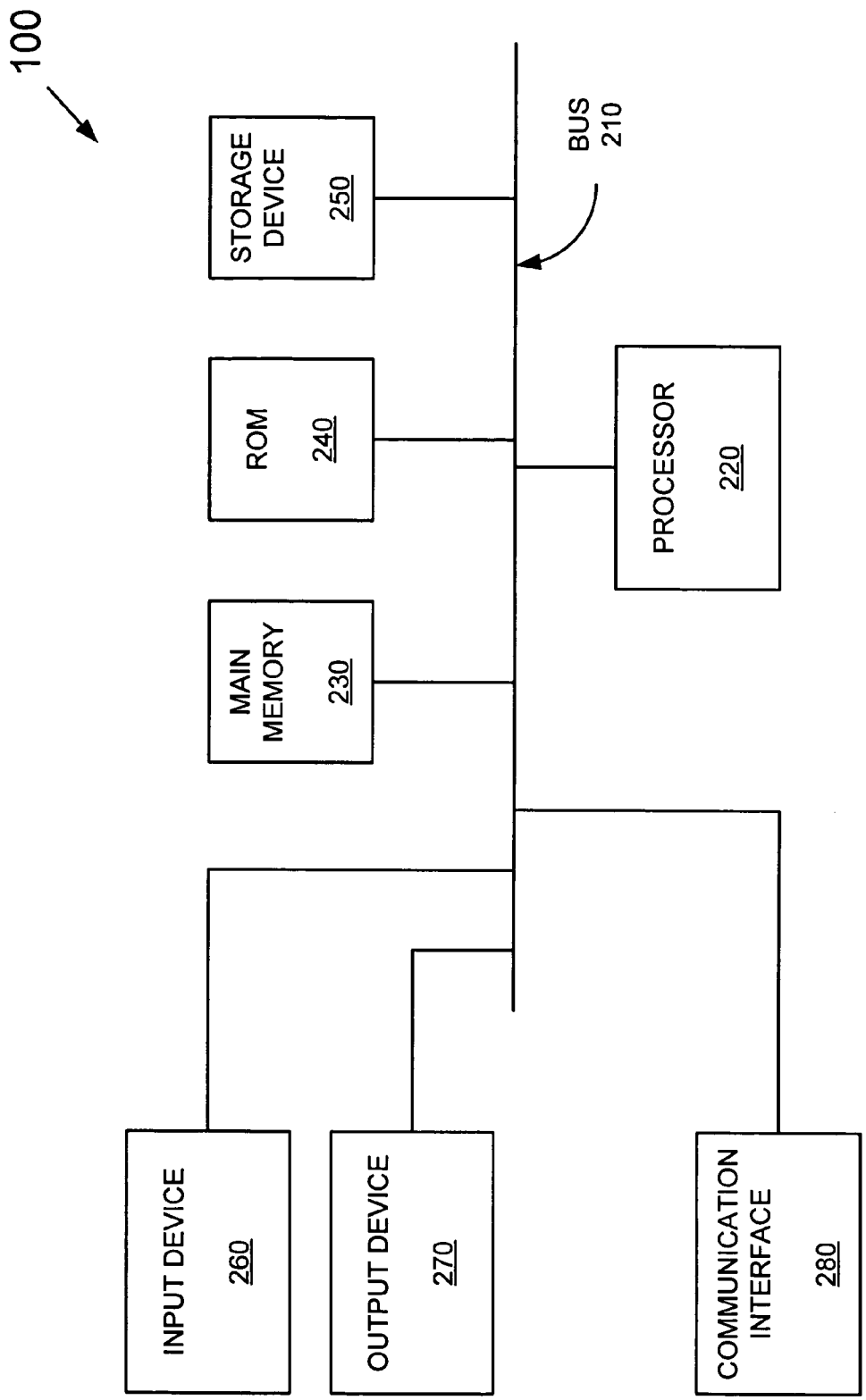
FIG. 2 illustrates an exemplary configuration of the system of FIG. 1.

FIG. 2 illustrates an exemplary configuration of system 100 of FIG. 1. As illustrated, system 100 may include a bus 210, a processor 220, a memory 230, a read only memory (ROM) 240, a storage device 250, an input device 260, an output device 270, and a communication interface 280. Bus 210 permits communication among the components of system 100.

Processor 220 may include any type of conventional processor or microprocessor that interprets and executes instructions. In alternative implementations, processor 220 may be implemented as a field programmable gate array (FPGA), application specific integrated circuit (ASIC), or the like. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to system 100, such as keyboard 120, pointing device 130 (e.g., a mouse, a pen, and the like), one or more biometric mechanisms, such as a voice recognition device, etc. Output device 270 may include one or more conventional mechanisms that output information to the operator, such as a display (e.g., monitor 140), a printer, a speaker, etc. Communication interface 280 may include any transceiver-like mechanism that enables system 100 to communicate with other devices and/or systems. For example, communication interface 280 may include a modem or an Ethernet interface to a network. Alternatively, communication interface 280 may include other mechanisms for communicating via a data network.

System 100 may implement the functions described below in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement the invention. Thus, implementations consistent with the principles of the invention are not limited to any specific combination of hardware circuitry and software.

System 100, consistent with the principles of the invention, may include a data processing program that may be associated with a dictionary. The dictionary may be stored, for example, in memory 230, or externally to system 100.

Figure 3:
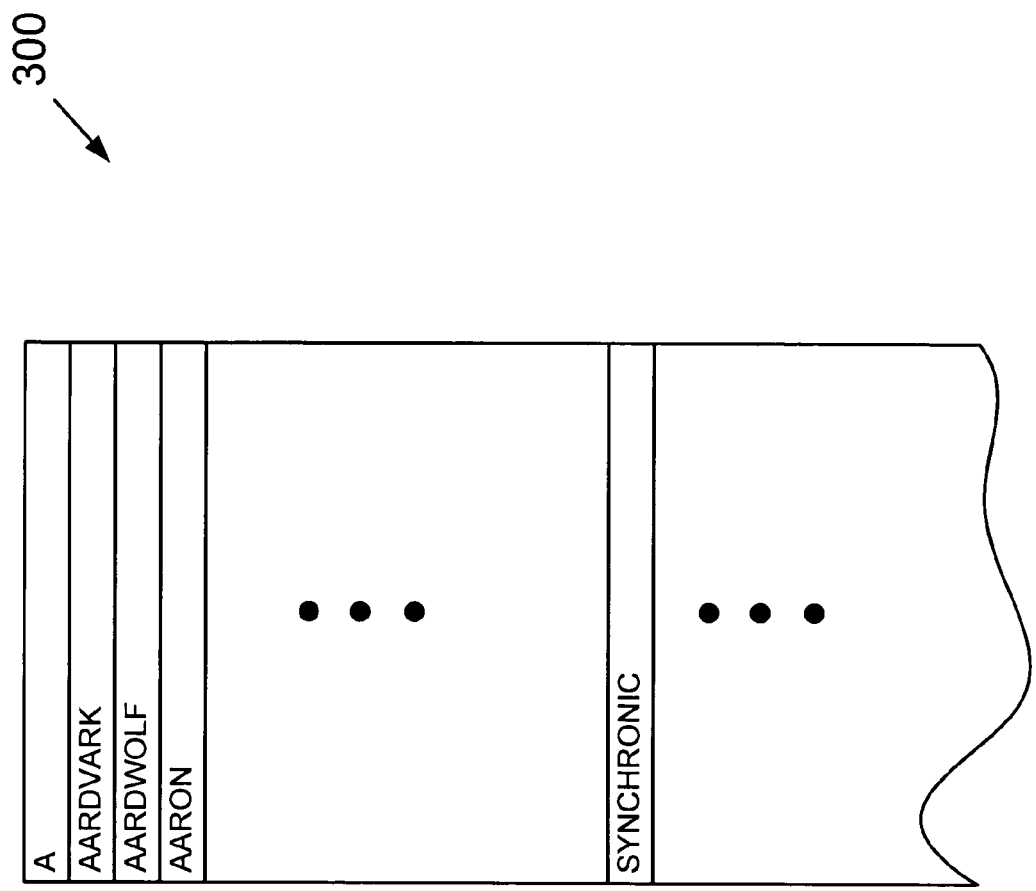
FIG. 3 illustrates an exemplary dictionary that may be associated with the system of FIG. 1.

FIG. 3 illustrates an exemplary dictionary 300 consistent with the principles of the invention. While only one dictionary is described below, it will be appreciated that dictionary 300 may consist of multiple dictionaries stored locally at system 100 or external to system 100. As illustrated, dictionary 300 may include a list of dictionary words. These words may, in one implementation consistent with the principles of the invention, be arranged alphabetically, as illustrated, in FIG. 3. A user of system 100 may modify the entries in dictionary 300 by adding or deleting entries.

Exemplary Processing

Figure 4:
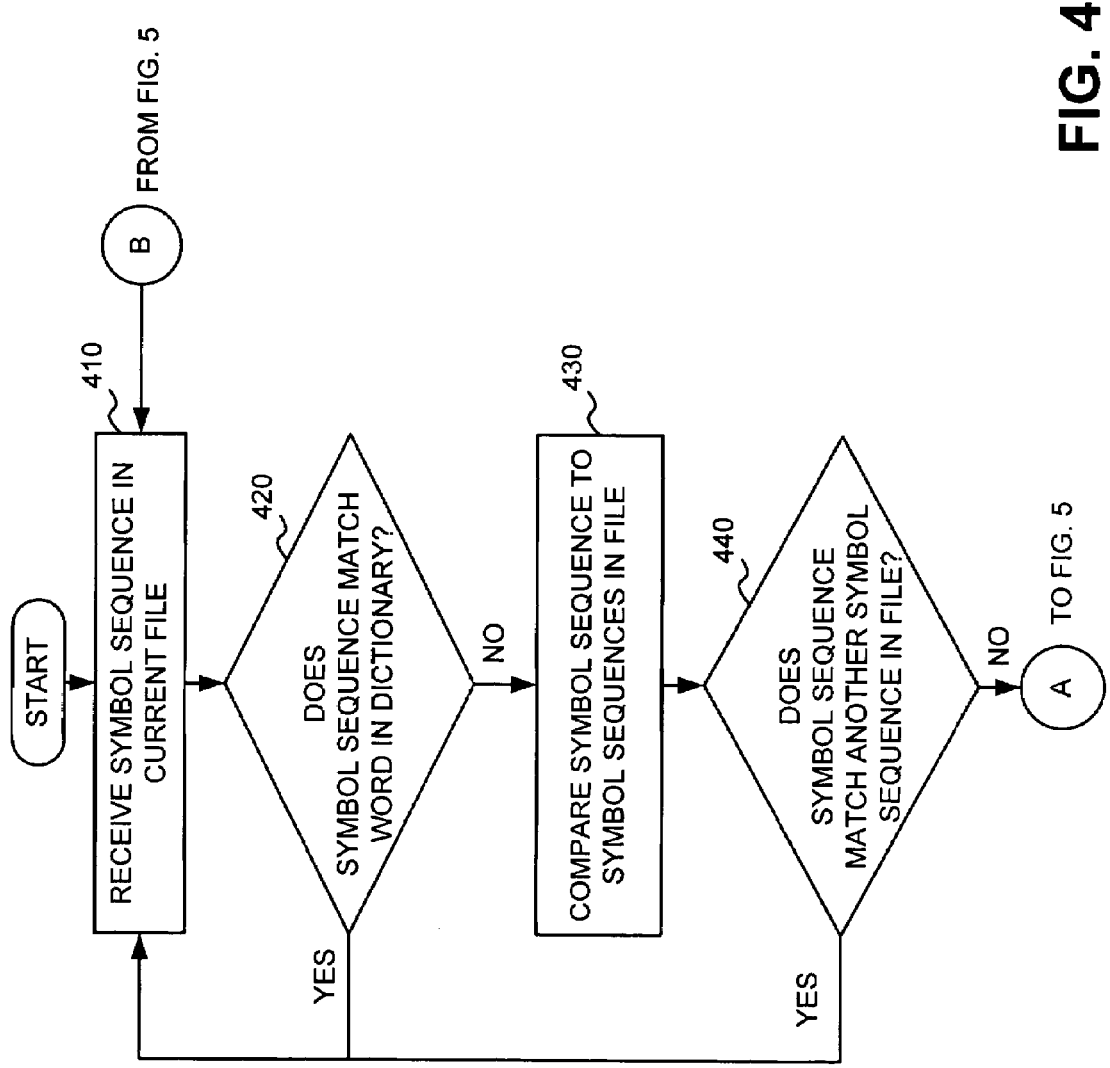
FIGS. 4 and 5 illustrate an exemplary process for changing symbol sequences in documents in an implementation consistent with the principles of the invention.
Figure 5:
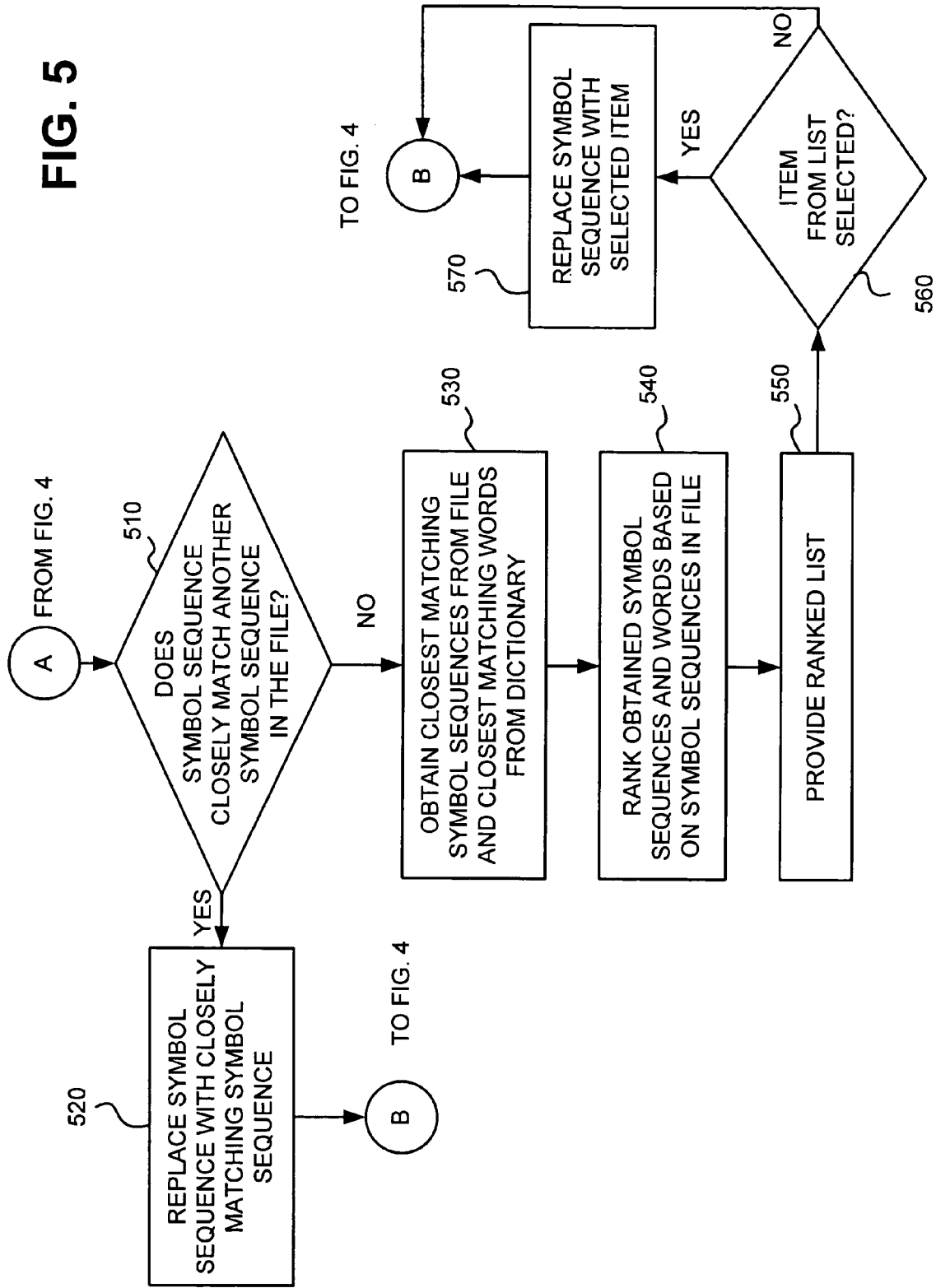

FIGS. 4 and 5 illustrate an exemplary process for changing symbol sequences in documents in an implementation consistent with the principles of the invention. Processing may begin by receiving a symbol sequence into the current file (e.g., a current word processing document or any other type of file in which symbol sequence correction or changing would be desired) [act 410, FIG. 4]. The symbol sequence may, for example, be received in response to a user depressing keys on keyboard 120. System 100 may determine that a symbol sequence has been received when a delimiter character has been detected. In one implementation, system 100 may recognize the following characters as delimiter characters: hard space ( ), period (.), comma (,), semicolon (;), colon (:), quotation mark ("), single quotation mark ('), exclamation point (!), question mark (?), and the like. Therefore, for example, when a delimiter character is received, the symbols preceding the delimiter character may be considered a symbol sequence.

It may then be determined if the received symbol sequence matches a word in a dictionary, such as dictionary 300 [act 420]. If the symbol sequence matches a word in the dictionary, then processing may return to act 410 with system 100 receiving the next symbol sequence. If, on the other hand, the symbol sequence does not match a word in the dictionary, the symbol sequence may be compared to the symbol sequences that are already contained in the current file [act 430]. If the symbol sequence matches one or more other symbol sequences in the current file [act 440], then processing may return to act 410 with the receipt of the next symbol sequence.

If, on the other hand, the received symbol sequence does not match another symbol sequence in the current file [act 440], then it may be determined whether the received symbol sequence closely matches a symbol sequence already contained in the current file [act 510, FIG. 5]. In one implementation, the probability of whether the received symbol sequence matches each symbol sequence already contained in the file may be determined. The probability may take into consideration, for example, the number of occurrences of each particular symbol sequence in the file. So, for example, if a particular symbol sequence occurs more than a predetermined number of times in the document and the received symbol sequence closely matches that particular symbol sequence, then the probability of the received symbol sequence matching the particular symbol sequence may be very high. Also, if the received symbol sequence closely matches a particular symbol sequence from the file, variations of the particular symbol sequence may be considered and their probabilities determined. For example, "jumps," "jumped," and "jumping" are variations of the word "jump." A number of conventional techniques exist for determining the probability of whether one item matches another item.

If the received symbol sequence closely matches another symbol sequence in the file (e.g., the probability of the symbol sequence matching the other symbol sequence is above a predetermined threshold), the received symbol sequence may be automatically replaced with the other, closely matching symbol sequence [act 520]. In one implementation, the threshold for automatically replacing symbol sequences in the file may be configurable by the user to allow the user to determine how close a particular symbol sequence has to be to the received symbol sequence in order for the received symbol sequence to be replaced with the particular symbol sequence. Processing may then return to act 410 (FIG. 4) with the receipt of the next symbol sequence.

If, on the other hand, no closely matching symbol sequences are present in the file [act 510], the closest matching symbol sequences from the file may be obtained, along with the closest matching words from the dictionary [act 530]. In one implementation, the number of closest matching symbol sequences from the file may be limited. Similarly, the number of closest matching words from the dictionary may also be limited. In one implementation, the number of symbol sequences obtained from the file may approximately equal the number of words from the dictionary (e.g., the four most closely matching symbol sequences and the four most closely matching words may be obtained). In other implementations, the number of symbol sequences and words that are obtained may be based on the probabilities of these symbol sequences and words matching the received symbol sequence. For example, all symbol sequences and words may be obtained whose probability of matching the received symbol sequence is above a threshold. In one implementation, the threshold may be configurable by the user to allow the user to determine whether a greater number of items or lesser number of items will be provided to the user.

Moreover, the words that are obtained from the dictionary may be based on the symbol sequences obtained from the file. For example, if a particular symbol sequence closely matches the received symbol sequence, words that closely relate to the closely matching symbol sequence may be obtained from the dictionary. In one implementation, if it is determined that the probability of one of the words from the dictionary matching the received symbol sequence is above the first threshold above (i.e., the threshold for determining whether the received symbol sequence is automatically replaced), then the received symbol sequence may be automatically replaced with the word.

The closest matching symbol sequences and words may be ranked to create a ranked list [act 540]. Any conventional technique for ranking the closest matching symbol sequences and words may be used. For example, the ranking may be based on how closely the symbol sequences and words match the received symbol sequence. Other techniques for ranking the closest matching symbol sequences and words may alternatively be used.

The ranked list of closest matching symbol sequences and words may be provided to the user [act 550]. In one implementation, a user-configurable number of the highest ranking symbol sequences and words may be provided to the user. The ranked list may be provided automatically (e.g., as an automatic popup window) or may be provided in response to an action by the user. For example, in one implementation, the ranked list may be provided in response to the user selecting the symbol sequence. In this situation, the ranked list, for example, may be provided after other symbol sequences are received in the current file.

Once the ranked list is provided to the user, it may then be determined whether the user selected one of the items in the ranked list [act 560]. The user may select an item from the ranked list in any conventional manner. For example, the user may select an item from the ranked list using a mouse pointer.

If the user selects an item from the ranked list [act 560], the received symbol sequence is automatically replaced with the selected item [act 570]. If, on the other hand, the user does not select an item from the list [act 560] or after the received symbol sequence is automatically replaced with a select item [act 570], processing may return to act 410 above with system 100 receiving another symbol sequence.

It will be appreciated that system 100 may periodically re-perform any or all of acts 420-570 on any symbol sequences that do not match a word in the dictionary. In one implementation, system 100 may re-perform any or all of acts 420-570 on those symbol sequences not matching a word in the dictionary at predetermined intervals. In other implementations, system 100 may re-perform any or all of acts 420-570 during those instances where system 100 is in an idle state (e.g., when the user stops typing into the current file).

It will be further appreciated that while the above process includes both automatic replacement of symbol sequences and provisioning of a linked list, these acts may be separately provided in other implementations. For example, a process consistent with the principles of the invention may provide one or both of these separate acts.

Figure 6:
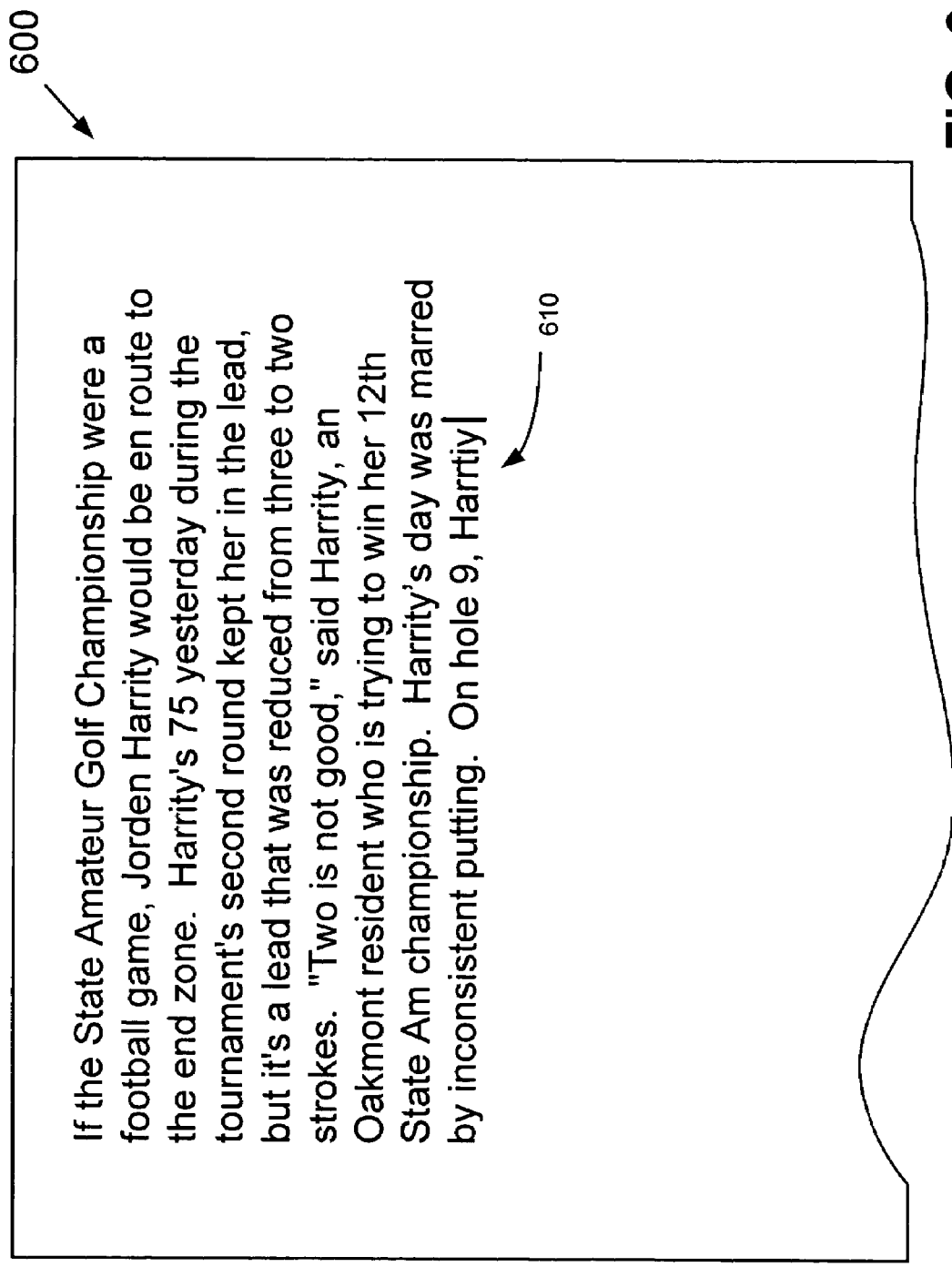
FIGS. 6 and 7 illustrate an example, consistent with the principles of the invention, of the processing described in FIGS. 4 and 5.
Figure 7:
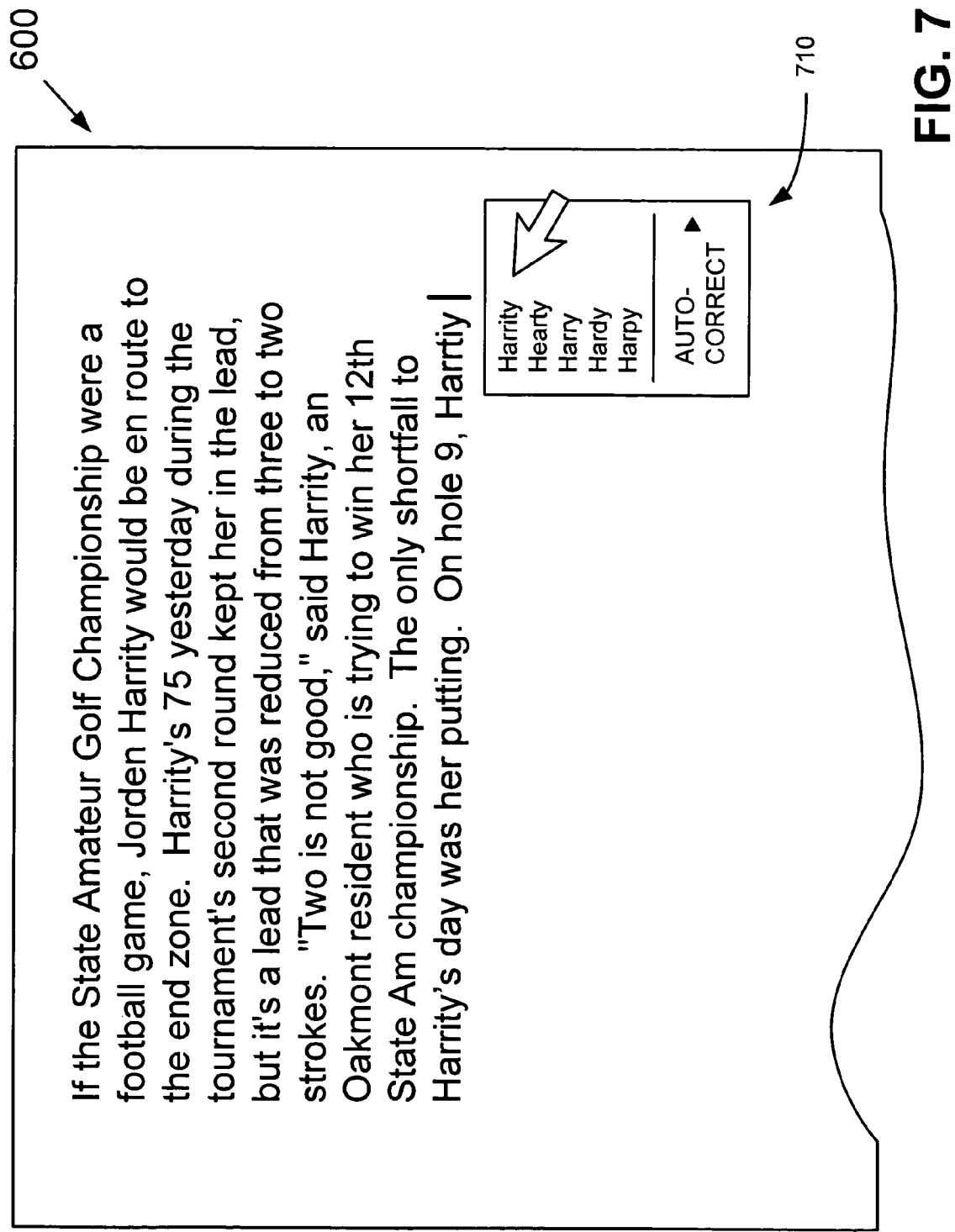

FIGS. 6 and 7 illustrate a first example of the above processing consistent with the principles of the invention. With reference to FIG. 6, assume that a group of symbol sequences 600 has been received into a current file. Moreover, assume that the probability threshold for automatically replacing a symbol sequence in the current file is 98% and the probability threshold for determining whether another symbol sequence or word closely matches the symbol sequence is 75%. It will be appreciated that these threshold values are provided for explanatory purposes only. Other values may alternatively be used.

As illustrated in FIG. 6, the symbol sequence "Harrtiy" has been received into the current file. Following the processing set forth above with respect to FIGS. 4 and 5, the symbol sequence, "Harrtiy," may be compared to words in the dictionary (e.g., dictionary 300). Since the symbol sequence, "Harrtiy," does not match any of the words in the dictionary, the symbol sequence is compared to all other symbol sequences in the file to determine whether it matches any of the other symbol sequences in the file.

Since the symbol sequence does not match any of the other symbol sequences in the file, it will be determined whether the symbol sequence, "Harrtiy," closely matches any other symbol sequence in the file. In one implementation, the determination of whether the symbol sequence closely matches another symbol sequence may be based on the probability of the symbol sequence matching another symbol sequence. Assume, for example, that it is determined that the probability of the symbol sequence, "Harrtiy," matching the symbol sequence, "Harrity," is 99%. In this instance, the symbol sequence, "Harrtiy," would be automatically replaced with the symbol sequence, "Harrity."

Assume, as an alternative, that it is determined that the probability of the symbol sequence, "Harrtiy," matching the symbol sequence, "Harrity," is 95% and, therefore, the symbol sequence is not automatically replaced. In this situation, the closest matching symbol sequences from the file and the closest matching symbol sequences from the dictionary may be obtained. In one implementation, the closest matching symbol sequences and words may be obtained based on the probability of the symbol sequence matching another symbol sequence or word. Assume, for example, that it is determined that the probability of the symbol sequence, "Harrtiy," matching the symbol sequence, "Harrity," is, as set forth above, 95%, and that the probability of the symbol sequence, "Harrtiy," matching any other symbol sequence in the file is below 75% (the threshold value). Moreover, assume, for example, that it is determined that the probability of the symbol sequence, "Harrtiy," matching the word, "Hearty," is 80%, the probability of the symbol sequence, "Harrtiy," matching the word, "Harry," is 79%, the probability of the symbol sequence, "Harrtiy," matching the word, "Hardy," is 77%, and the probability of the symbol sequence, "Harrtiy," matching the word, "Harpy," is 76%. Therefore, the closest matching symbol sequences and words include: "Harrity," "Hearty," "Harry," "Hardy," and "Harpy."

These closest matching symbol sequences and words may then be ranked based, for example, on their probability of matching the symbol sequence, "Harrtiy." Table 1 below illustrates the ranked list of closely matching symbol sequences and words.

TABLE 1

| Harrity | 95% |
| Hearty | 80% |
| Harry | 79% |
| Hardy | 77% |
| Harpy | 76% |

The ranked list of closely matching symbol sequences and words may then be provided. In one implementation, the ranked list may be provided via a popup window, such as popup window 710, illustrated in FIG. 7. Popup window 710 may automatically appear when the symbol sequence, "Harrtiy," is received or may appear in response to a user action. In the latter instance, popup window 710 may appear after additional symbol sequences have been received into the current file. As illustrated, popup window 710 may also include an auto-correct feature that allows the user to add one of the items from the ranked list to an auto-correct list.

Upon selection of one of the items in the ranked list, the symbol sequence, "Harrtiy," may be automatically replaced.

Figure 8:
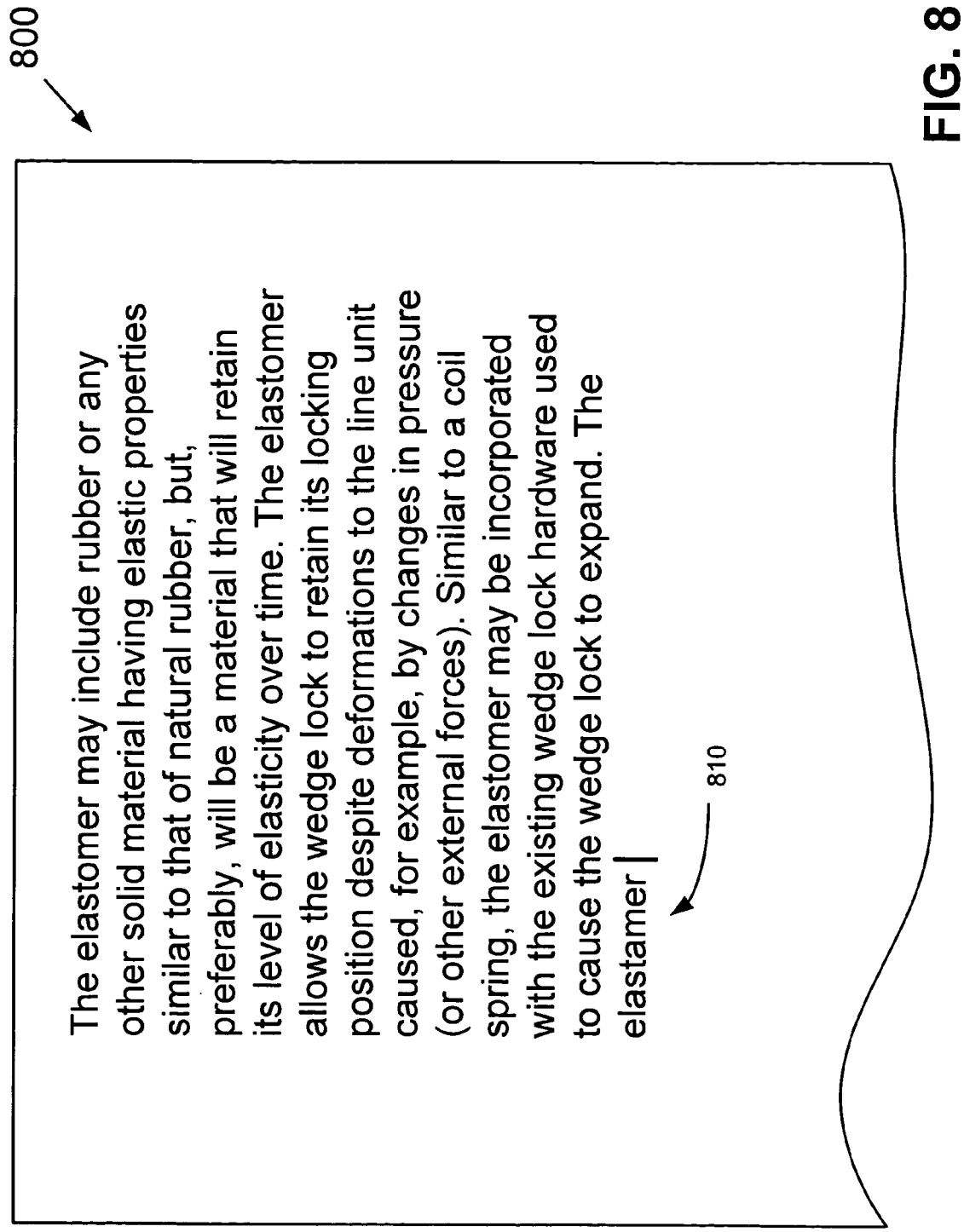

FIGS. 8 and 9 illustrate a second example of the above processing consistent with the principles of the invention. With reference to FIG. 8, assume that a group of symbol sequences 800 has been received into a current file. Moreover, assume that the probability threshold for automatically replacing a symbol sequence in the current file is 98% and the probability threshold for determining whether another symbol sequence or word closely matches the symbol sequence is 75%. It will be appreciated that these threshold values are provided for explanatory purposes only. Other values may alternatively be used.

As illustrated in FIG. 8, the symbol sequence "elastamer" has been received into the current file. Following the processing set forth above with respect to FIGS. 4 and 5, the symbol sequence, "elastamer," may be compared to words in the dictionary (e.g., dictionary 300). Since the symbol sequence, "elastamer," does not match any of the words in the dictionary, the symbol sequence is compared to all other symbol sequences in the file to determine whether it matches any of the other symbol sequences in the file.

Since the symbol sequence does not match any of the other symbol sequences in the file, it will be determined whether the symbol sequence, "elastamer," closely matches any other symbol sequence in the file. In one implementation, the determination of whether the symbol sequence closely matches another symbol sequence may be based on the probability of the symbol sequence matching another symbol sequence. Assume, for example, that it is determined that the probability of the symbol sequence, "elastamer," matching the symbol sequence, "elastomer," is 99%. In this instance, the symbol sequence, "elastamer," would be automatically replaced with the symbol sequence, "elastomer." If probabilities of two or more symbol sequences from the file are above the threshold, the symbol sequence with the highest probability may be selected to replace the received symbol sequence.

Assume, as an alternative, that it is determined that the probability of the symbol sequence, "elastamer," matching the symbol sequence, "elastomer," is 97% and, therefore, the symbol sequence is not automatically replaced. In this situation, the closest matching symbol sequences from the file and the closest matching symbol sequences from the dictionary may be obtained. In one implementation, the closest matching symbol sequences and words may be obtained based on the probability of the symbol sequence matching another symbol sequence or word.

Assume, for example, that it is determined that the probability of the symbol sequence, "elastamer," matching the symbol sequence, "elastomer," is, as set forth above, 97%, the probability of the symbol sequence, "elastamer," matching the symbol sequence, "telastomeric," is 90%, the probability of the symbol sequence, "elastamer," matching the symbol sequence, "elastic," is 79%, the probability of the symbol sequence, "elastamer," matching the symbol sequence, "elasticity," is 78%, and that the probability of the symbol sequence, "elastamer," matching any other symbol sequence in the file is below 75% (the threshold value). Moreover, assume, for example, that it is determined that the only word from the dictionary that closely matches the symbol sequence is "easterner" with a probability of 75.5% (it is assumed for this example, that the word "elastomer" is not contained in the dictionary). Therefore, the closest matching symbol sequences and words include: "elastomer," "elastomeric," "elastic," "elasticity," and "easterner."

These closest matching symbol sequences and words may then be ranked based, for example, on their probability of matching the symbol sequence, "elastamer." Table 2 below illustrates the ranked list of closely matching symbol sequences and words.

TABLE 2

| | |
|---|---|
| elastomer | 97% |
| elastomeric | 90% |
| elastic | 79% |
| elasticity | 78% |
| easterner | 75.5% |

The ranked list of closely matching symbol sequences and words may then be provided. In one implementation, the ranked list may be provided via a popup window, such as popup window 910, illustrated in FIG. 9. Popup window 910 may automatically appear when the symbol sequence, "elastamer," is received or may appear in response to a user action. In the latter instance, popup window 910 may appear after additional symbol sequences have been received into the current file. As illustrated, popup window 910 may also include an auto-correct feature that allows the user to add one of the items from the ranked list to an auto-correct list.

Upon selection of one of the items in the ranked list, the symbol sequence, "elastamer," may be automatically replaced.

Figure 11:
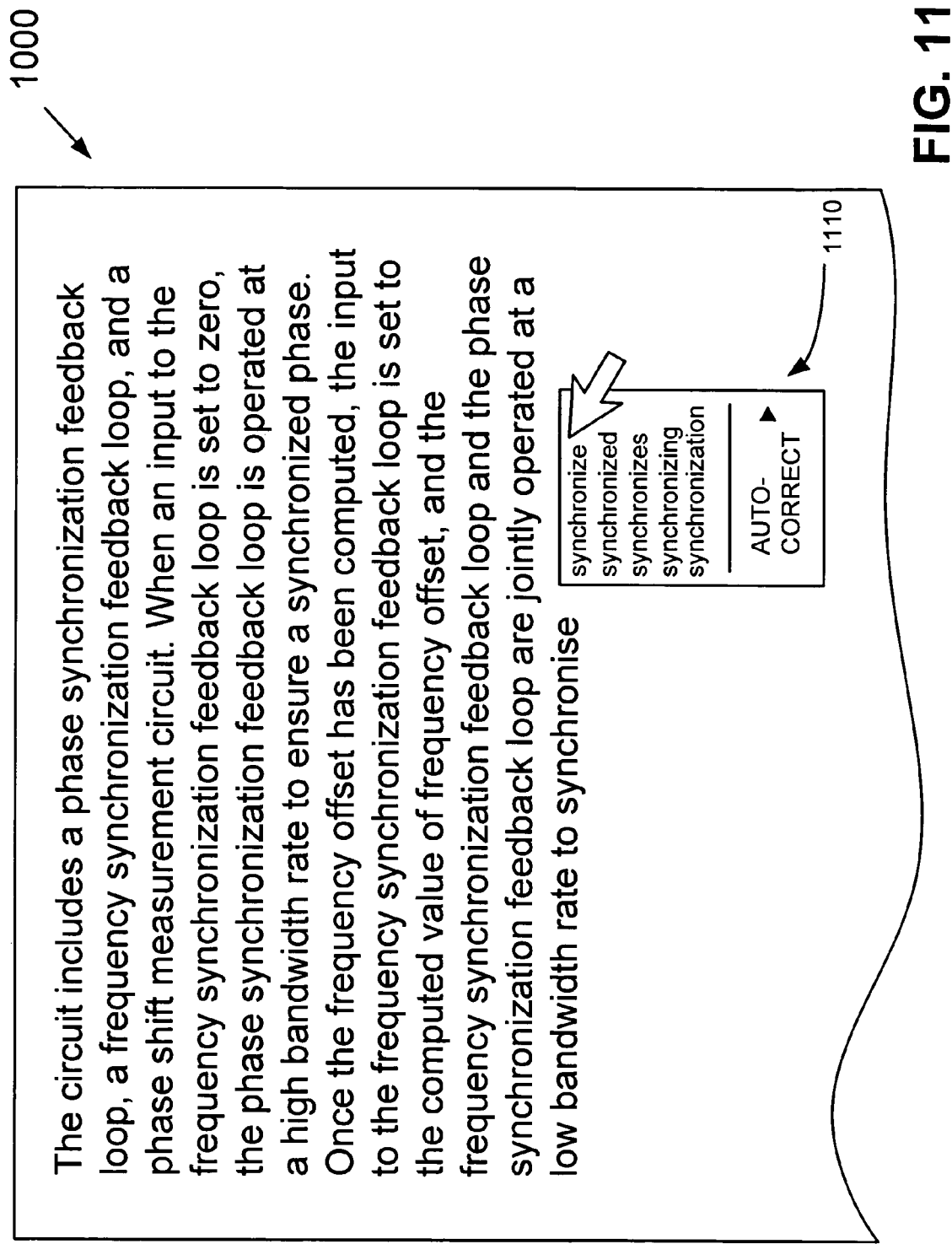

FIGS. 10 and 11 illustrate a third example of the above processing consistent with the principles of the invention. With reference to FIG. 10, assume that a group of symbol sequences 1000 has been received into a current file. Moreover, assume that the probability threshold for automatically replacing a symbol sequence in the current file is 98% and the probability threshold for determining whether another symbol sequence or word closely matches the symbol sequence is 75%. It will be appreciated that these threshold values are provided for explanatory purposes only. Other values may alternatively be used.

As illustrated in FIG. 10, the symbol sequence "synchronise" has been received into the current file. Following the processing set forth above with respect to FIGS. 4 and 5, the symbol sequence, "synchronise," may be compared to words in the dictionary (e.g., dictionary 300). Since the symbol sequence, "synchronise," does not match any of the words in the dictionary, the symbol sequence is compared to all other symbol sequences in the file to determine whether it matches any of the other symbol sequences in the file.

Since the symbol sequence does not match any of the other symbol sequences in the file, it will be determined whether the symbol sequence, "synchronise," closely matches any other symbol sequence in the file. In one implementation, the determination of whether the symbol sequence closely matches another symbol sequence may be based on the probability of the symbol sequence matching another symbol sequence. Assume, for this example, that the probability of the most closely matching symbol sequence from the file is determined to be 95% and, therefore, the symbol sequence is not automatically replaced. In this situation, the closest matching symbol sequences from the file and the closest matching symbol sequences from the dictionary may be obtained. In one implementation, the closest matching symbol sequences and words may be obtained based on the probability of the symbol sequence matching another symbol sequence or word.

Assume, for example, that it is determined that the probability of the symbol sequence, "synchronise," matching the symbol sequence, "synchronized," is 95%, that the probability of the symbol sequence, "synchronise," matching the symbol sequence, "synchronization," is 85%, and that the probability of the symbol sequence, "synchronise," matching any other symbol sequence in the file is below 75% (the threshold value).

As set forth above, the words selected from the dictionary may be based on the most closely matching symbol sequences in the file. Since the symbol sequence, "synchronized," has a high probability of matching, the following words may be obtained from the dictionary: "synchronize," "synchronizes," and "synchronizing." Assume, for example, that the probability of the symbol sequence, "synchronise," matching the symbol sequence, "synchronize," is 99%. In this example, the symbol sequence, "synchronise," would be automatically replaced with the symbol sequence, "synchronize."

As an alternative, assume, for example, that the probability of the symbol sequence, "synchronise," matching the symbol sequence, "synchronize," is 97.9%, that the probability of the symbol sequence, "synchronise," matching the symbol sequence, "synchronizes," is 95%, that the probability of the symbol sequence, "synchronise," matching the symbol sequence, "synchronizing," is 87%, and that the probability of the symbol sequence, "synchronise," matching any other word from the dictionary is below 75% (the threshold value).

These closest matching symbol sequences and words may then be ranked based, for example, on their probability of matching the symbol sequence, "synchronise." Table 3 below illustrates the ranked list of closely matching symbol sequences and words.

TABLE 3

| | |
|---|---|
| synchronize | 97.9% |
| synchronized | 95% |
| synchronizes | 95% |
| synchronizing | 87% |
| synchronization | 85% |

The ranked list of closely matching symbol sequences and words may then be provided. In one implementation, the ranked list may be provided via a popup window, such as popup window 1110, illustrated in FIG. 11. Popup window 1110 may automatically appear when the symbol sequence, "synchronise," is received or may appear in response to a user action. In the latter instance, popup window 1110 may appear after additional symbol sequences have been received into the current file. As illustrated, popup window 1110 may also include an auto-correct feature that allows the user to add one of the items from the ranked list to an auto-correct list.

Upon selection of one of the items in the ranked list, the symbol sequence, "synchronise," may be automatically replaced.

Figure 12:
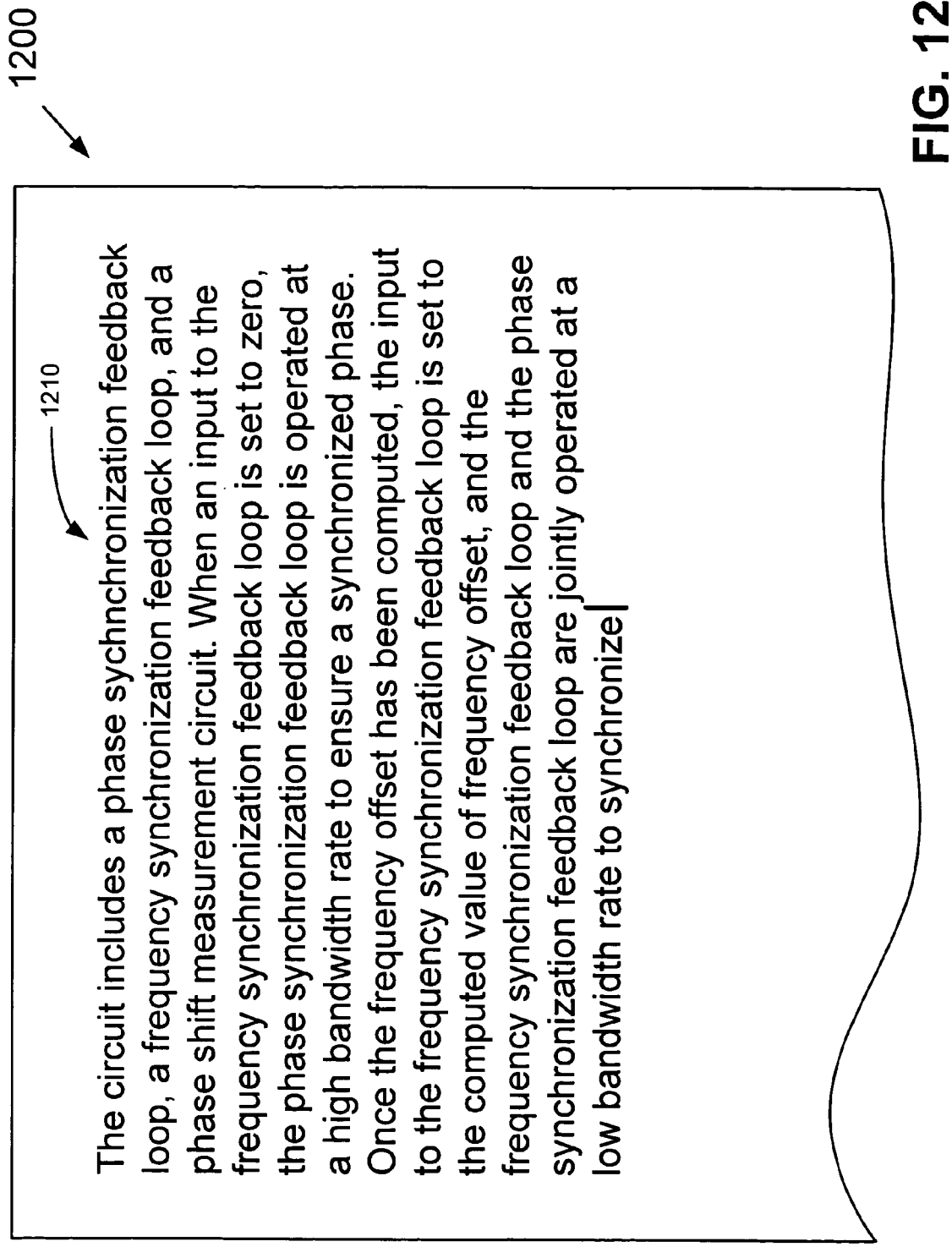

FIGS. 12 and 13 illustrate a fourth example of the above processing consistent with the principles of the invention. With reference to FIG. 12, assume that a group of symbol sequences 1200 has been received into a current file. Moreover, assume that the probability threshold for automatically replacing a symbol sequence in the current file is 98% and the probability threshold for determining whether another symbol sequence or word closely matches the symbol sequence is 75%. It will be appreciated that these threshold values are provided for explanatory purposes only. Other values may alternatively be used.

As set forth above, at periodic intervals (e.g., during idle periods), the processing described in FIGS. 4 and 5 may be performed on symbol sequences 1200 in the current file. With reference to FIG. 12, since the symbol sequence 1210, "sychnchronization," does not match any word in the dictionary, symbol sequence 1210 is compared to all other symbol sequences in the file to determine whether it matches any of the other symbol sequences in the file. Since symbol sequence 1210 does not match any of the other symbol sequences in the file, it is determined whether the symbol sequence, "sychnchronization," closely matches any other symbol sequence in the file. In one implementation, the determination of whether the symbol sequence closely matches another symbol sequence may be based on the probability of the symbol sequence matching another symbol sequence. Assume, for this example, that the probability of symbol sequence 1210 matching the symbol sequence, "synchronization," is determined to be 99%. Therefore, symbol sequence 1210 is automatically replaced with symbol sequence 1310, "synchronization," as illustrated in FIG. 13. In this situation, system 100 may periodically go through a current file and automatically correct misspelled words.

CONCLUSION

Implementations consistent with the principles of the invention improve the changing of symbol sequences in documents. In one implementation, an unknown symbol sequence in a document, such as a word processing document, is compared to other symbol sequences in the word processing document. If the unknown symbol sequence closely matches another symbol sequence in the word processing document, the unknown symbol sequence may be automatically replaced with the closely matching symbol sequence. Alternatively, a list of closely matching symbol sequences from the word processing document may be generated, along with a list of closely matching words from a dictionary. The two lists may be combined and ranked based on the symbol sequences in the word processing document. The ranked list (or a predetermined number of highest ranking items in the ranked list) may be provided to a user. Upon selection of one of the items in the provided list, the unknown symbol sequence may be automatically replaced with the selected item. In this way, auto-correction of symbol sequences in documents can be improved.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while not explicitly described above, it will be appreciated that the probabilities assigned to potentially matching symbol sequences and words may be based, in some implementations consistent with the principles of the invention, on the context of the received symbol sequence in the file.

While a series of acts has been described with regard to FIGS. 4 and 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-readable memory device comprising instructions that controls at least one processor to perform a method comprising:
   receiving a symbol sequence into a document;
   comparing the received symbol sequence to a list of previously-stored words;
   comparing the received symbol sequence to each other symbol sequence in the document when the received symbol sequence does not match any of the words in the list;
   determining a probability of the received symbol sequence matching one or more other symbol sequences in the document when the received symbol sequence does not match any of the other symbol sequences in the document;
   determining a probability of the received symbol sequence matching one or more variations of another symbol sequence in the document when the received symbol sequence does not match any of the symbol sequences in the document;
   replacing the received symbol sequence with another symbol sequence in the document or a variation of another symbol sequence in the document when the probability of the received symbol sequence matching the other symbol sequence is above a threshold;
   obtaining a number of symbol sequences from the document and a number of words from the list that most closely match the received symbol sequence to form a second list when the probability of the received symbol sequence matching another symbol sequence in the document or a variation of another symbol sequence in the document does not exceed the threshold;
   ranking the second list based on the symbol sequences in the document to form a ranked list of items;
   providing the ranked list of items;
   detecting selection of an item in the ranked list of items; and
   replacing the received symbol sequence with the selected item.

2. The computer-readable memory device of claim 1 wherein the document includes at least one of a word processing document, an e-mail file, a spreadsheet, a database file, an e-mail message, or a visual presentation file.

3. The computer-readable memory device of claim 1 wherein the determining a probability of the received symbol sequence matching one or more other symbol sequences in the document includes:
   determining the probability of the received symbol sequence matching one or more other symbol sequences in the document based on a number of occurrences of the one or more other symbol sequences in the document.

4. The computer-readable memory device of claim 1 wherein the threshold is configurable.

5. The computer-readable memory device of claim 1 wherein the obtaining a number of words from the list that most closely match the received symbol sequence includes:
   selecting a word from the list based on a symbol sequence in the obtained number of symbol sequences.

6. The computer-readable memory device of claim 1 wherein the method further comprises:
   obtaining at least one variation of one of the number of symbol sequences in the second list, and
   including the at least one variation in the second list.

7. The computer-readable memory device of claim 1 wherein the providing the ranked list of items includes:
   providing the ranked list of items in response to a selection of the received symbol sequence in the document.

8. The computer-readable memory device of claim 1 wherein the providing the ranked list of items includes:
   providing the ranked list of items via a popup window.

9. The computer-readable memory device of claim 1 wherein the providing the ranked list of items includes:
   automatically providing the ranked list of items in response to the receiving a symbol sequence into a document.

10. The computer-readable memory device of claim 1 wherein the method further comprises:
    removing, prior to providing the ranked list of items, those items in the ranked list of items whose probability of matching the received symbol sequence is below a second threshold.

11. The computer-readable memory device of claim 10 wherein the second threshold is configurable.

12. The computer-readable memory device of claim 1 wherein the method further comprises:
    re-performing the comparing a symbol sequence to other symbol sequences in the document when the symbol sequence does not match any of the words in the list, determining a probability of the symbol sequence matching one or more other symbol sequences in the document when the symbol sequence does not match any of the other symbol sequences in the document, determining a probability of the symbol sequence matching one or more variations of another symbol sequence in the document when the received symbol sequence does not match any of the symbol sequences in the document, and replacing the received symbol sequence with another symbol sequence in the document or a variation of another symbol sequence in the document when the probability of the received symbol sequence matching the other symbol sequence is above the threshold at predetermined time intervals.

13. The computer-readable memory device of claim 1 wherein the method further comprises:
    re-performing the comparing a symbol sequence to other symbol sequences in the document when the symbol sequence does not match any of the words in the list, determining a probability of the symbol sequence matching one or more other symbol sequences in the document when the symbol sequence does not match any of the other symbol sequences in the document, determining a probability of the symbol sequence matching one or more variations of another symbol sequence in the document when the received symbol sequence does not match any of the symbol sequences in the document, and replacing the received symbol sequence with another symbol sequence in the document or a variation of another symbol sequence in the document when the probability of the received symbol sequence matching the other symbol sequence is above the threshold during an idle period.

* * * * *